(12) United States Patent
Lazzarino et al.

(10) Patent No.: US 11,772,695 B2
(45) Date of Patent: Oct. 3, 2023

(54) SHOPPING CART WITH ANTI-THEFT POLE

(71) Applicant: CART SOURCE LLC, Palm Beach, FL (US)

(72) Inventors: Nadia Lazzarino, Vaughan (CA); Phillip Lazzarino, Vaughan (CA)

(*) Notice: Subject to any disclaimer, the term of this patent is extended or adjusted under 35 U.S.C. 154(b) by 207 days.

(21) Appl. No.: 17/189,838

(22) Filed: Mar. 2, 2021

(65) Prior Publication Data

US 2022/0281502 A1 Sep. 8, 2022

(51) Int. Cl.
*B62B 3/14* (2006.01)

(52) U.S. Cl.
CPC .................... *B62B 3/1404* (2013.01)

(58) Field of Classification Search
CPC .................................................. B62B 3/1404
See application file for complete search history.

(56) References Cited

U.S. PATENT DOCUMENTS

| | | | | |
|---|---|---|---|---|
| 4,666,179 A * | 5/1987 | Adams | ............ | B62B 1/264 |
| | | | | D34/24 |
| 6,601,864 B1 * | 8/2003 | Hoyt | ............ | A61G 5/10 |
| | | | | 280/304.5 |
| 8,998,218 B1 * | 4/2015 | Bitondo | ............ | B62B 3/1488 |
| | | | | 280/33.992 |
| 9,010,769 B1 * | 4/2015 | Munive | ............ | B62B 5/0016 |
| | | | | 280/DIG. 4 |
| 10,913,476 B1 * | 2/2021 | Alyaqout | ............ | B62B 3/142 |
| 11,178,959 B1 * | 11/2021 | Stockton | ............ | F16M 11/28 |
| 2004/0245030 A1 * | 12/2004 | Holtan | ............ | B62B 3/1404 |
| | | | | 180/19.1 |
| 2005/0062247 A1 * | 3/2005 | Sheem | ............ | B62B 3/1404 |
| | | | | 280/79.2 |
| 2018/0334182 A1 * | 11/2018 | Bacallao | ............ | G06Q 30/0633 |

FOREIGN PATENT DOCUMENTS

DE          19816652 A1 * 12/1998   ........... B62B 3/1408

* cited by examiner

*Primary Examiner* — Brian L Swenson

(57) ABSTRACT

A shopping cart with a vertically extended anti-theft pole. The pole is mounted to the cart using a one-way interlock, that allows the pole to be mounted to the cart on premises, but not easily removed without damaging or tampering with the interlock. In this way, the carts may be brought into premises of interest, and equipped with the anti-theft device after delivery/deployment without any tools, skilled labour, or fasteners.

14 Claims, 6 Drawing Sheets

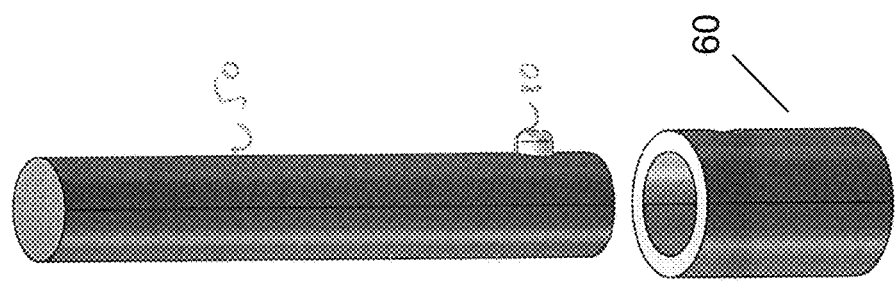
FIG. 8A
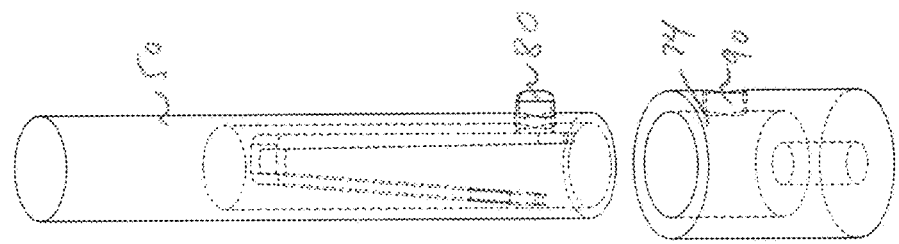
FIG. 8C
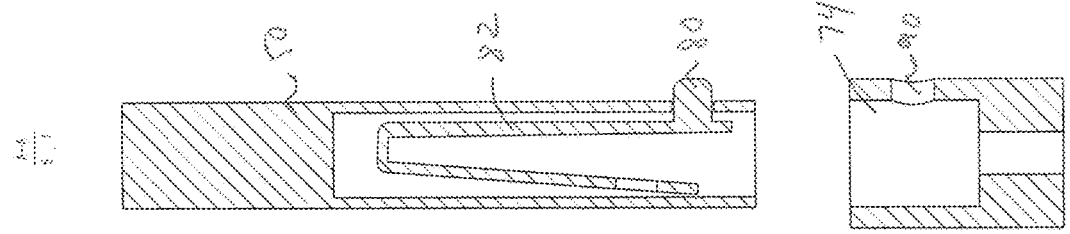
FIG. 8D
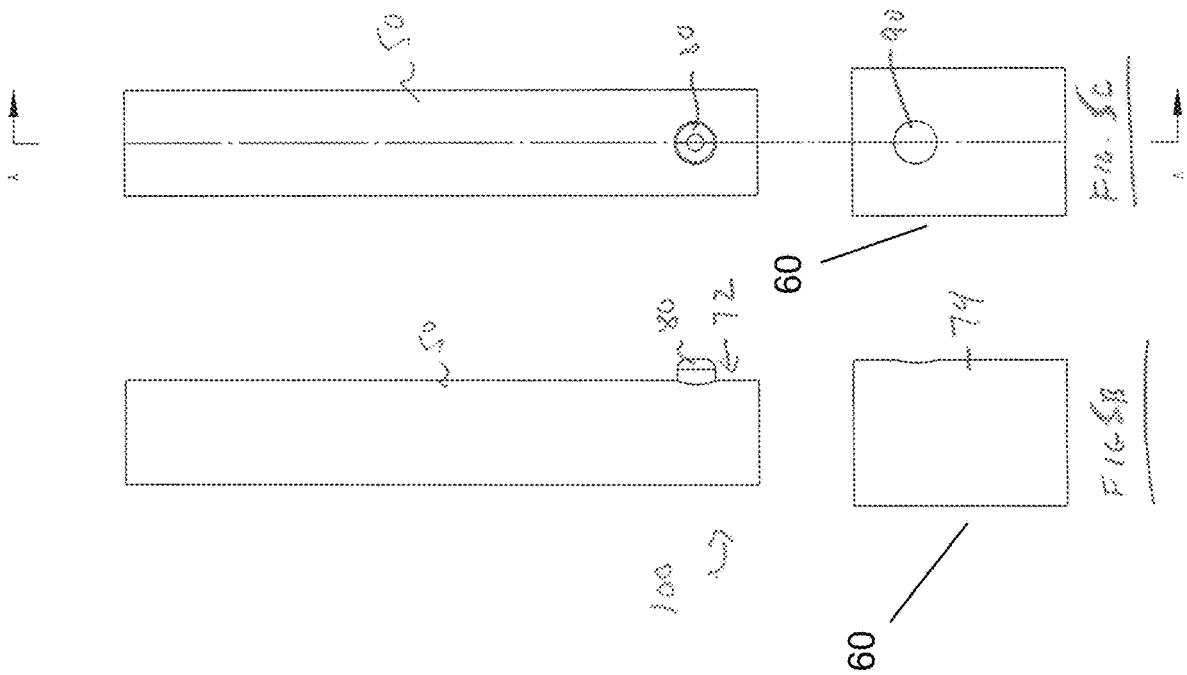
FIG. 8E
FIG. 8B

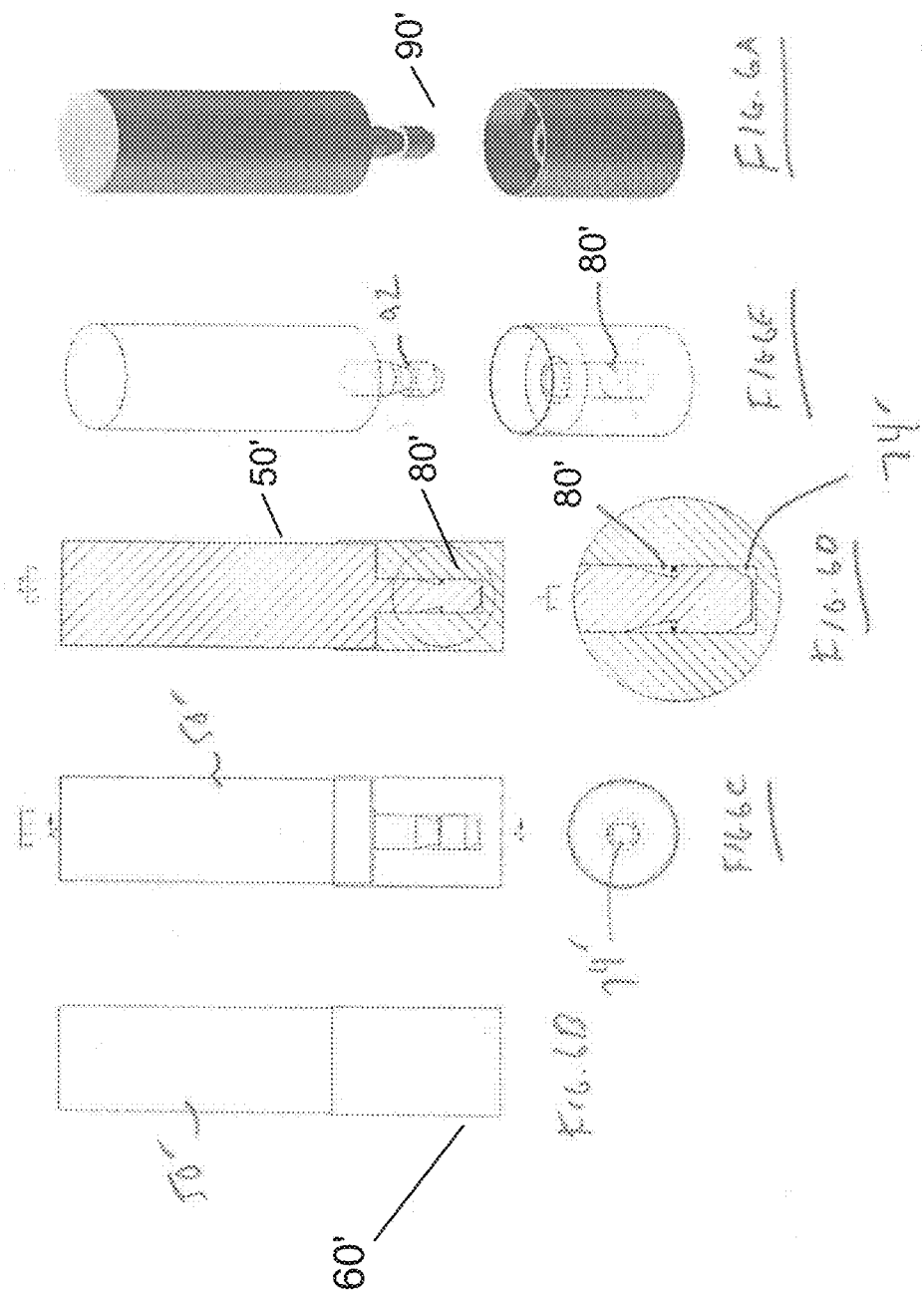

SHOPPING CART WITH ANTI-THEFT POLE

TECHNICAL FIELD

This relates to shopping carts, and more particularly rolling carts that include an anti-theft mechanism.

BACKGROUND

Shopping carts are common in grocery stores, supermarkets, and other retailers. Theft of such carts, however, has increasingly become a problem. For example, shopping carts are frequently taken off the retail premises and never returned. Such stolen shopping carts may also be discarded at the side of the road or another inconvenient location, causing problems for both retailers and shoppers.

As a consequence, many shopping carts are equipped with anti-theft mechanisms including, for example, locking wheels that prevent a shopping cart from being rolled beyond a defined, electrically or geographically fenced area.

Another known anti-theft mechanism simply requires fitting a cart with a pole that extends beyond the height of a doorway or an arch in the retail establishment. In this way, the top of the pole contacts the doorway or arch if any attempt to push the cart through the doorway or arch is made.

Of course, getting such a cart on-premises is often challenging. After all, the doorway or arch that prevents cart removal also prevents cart entry. One solution is to bring the carts into the premises through an alternate (larger) entrance, such a loading dock or garage. This, however, is not always practical as not all establishments have such an alternate entrance.

Another alternative is to bring the cart on-premises without the anti-theft pole installed. However, this requires the retailer to install the pole onto the shopping cart. This may also not be practical, since installing an anti-theft pole onto a shopping cart can be a laborious process, requiring special tools, trained personnel, and fasteners.

Accordingly, there is a need for a new anti-theft cart.

SUMMARY

According to an aspect, there is provided a shopping cart with a vertically extended anti-theft pole. The pole is mounted to the cart using a one-way interlock, that allows the pole to be mounted to the cart on premises, but not easily removed without damaging or tampering with the interlock. In this way, the carts may be brought into premises of interest, and equipped with the anti-theft device after delivery/deployment without any tools, skilled labour, or fasteners.

According to another aspect, there is provided a method of deploying an anti-theft shopping cart. The shopping cart includes a rolling frame, a basket supported by the frame, and a receptacle for receiving an anti-theft pole in a generally vertical orientation. The receptacle includes a one-way interlock for locking the anti-theft pole in the receptacle, so that the pole may not be removed from the interlock without damaging it. The method includes delivering the cart with the pole detached from the cart to an establishment where the anti-theft shopping cart is to be used, and inserting the anti-theft pole into the receptacle to lock the anti-theft pole into place.

Other features will become apparent from the drawings in conjunction with the following description.

BRIEF DESCRIPTION OF THE DRAWINGS

In the figures which illustrate example embodiments,

FIG. 5A is an enlarged fragmentary view of a portion of the shopping cart of FIG. 1, with an anti-theft pole removed;

FIGS. 5B and 5C are side and front views of FIG. 5A,

FIG. 5D is a cross-sectional view of FIG. 5B,

FIG. 5E is a transparent schematic view of FIG. 5A;

FIG. 6A is an enlarged fragmentary view of a portion of shopping cart of FIG. 1, with an alternate anti-theft pole, with pole removed;

FIG. 6B is side and front views of FIG. 6A;

FIG. 6C is a transparent schematic view of FIG. 6B

FIG. 6D is a cross-sectional view of FIG. 6C; and

FIG. 6E is a transparent schematic view of FIG. 6A.

DETAILED DESCRIPTION

Figure 1:
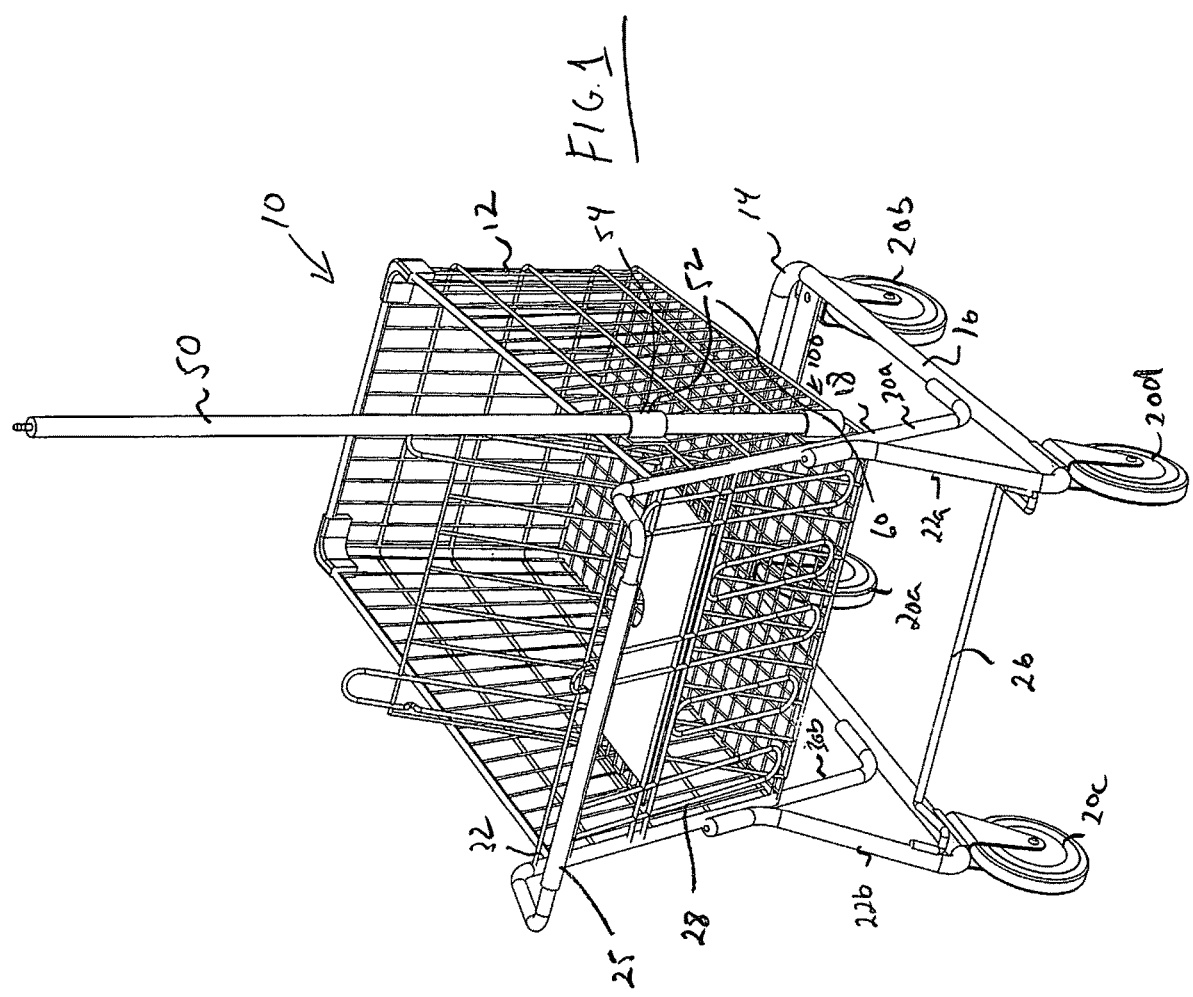
FIG. 1 is a perspective view of a shopping cart, exemplary of an embodiment.
Figure 2:
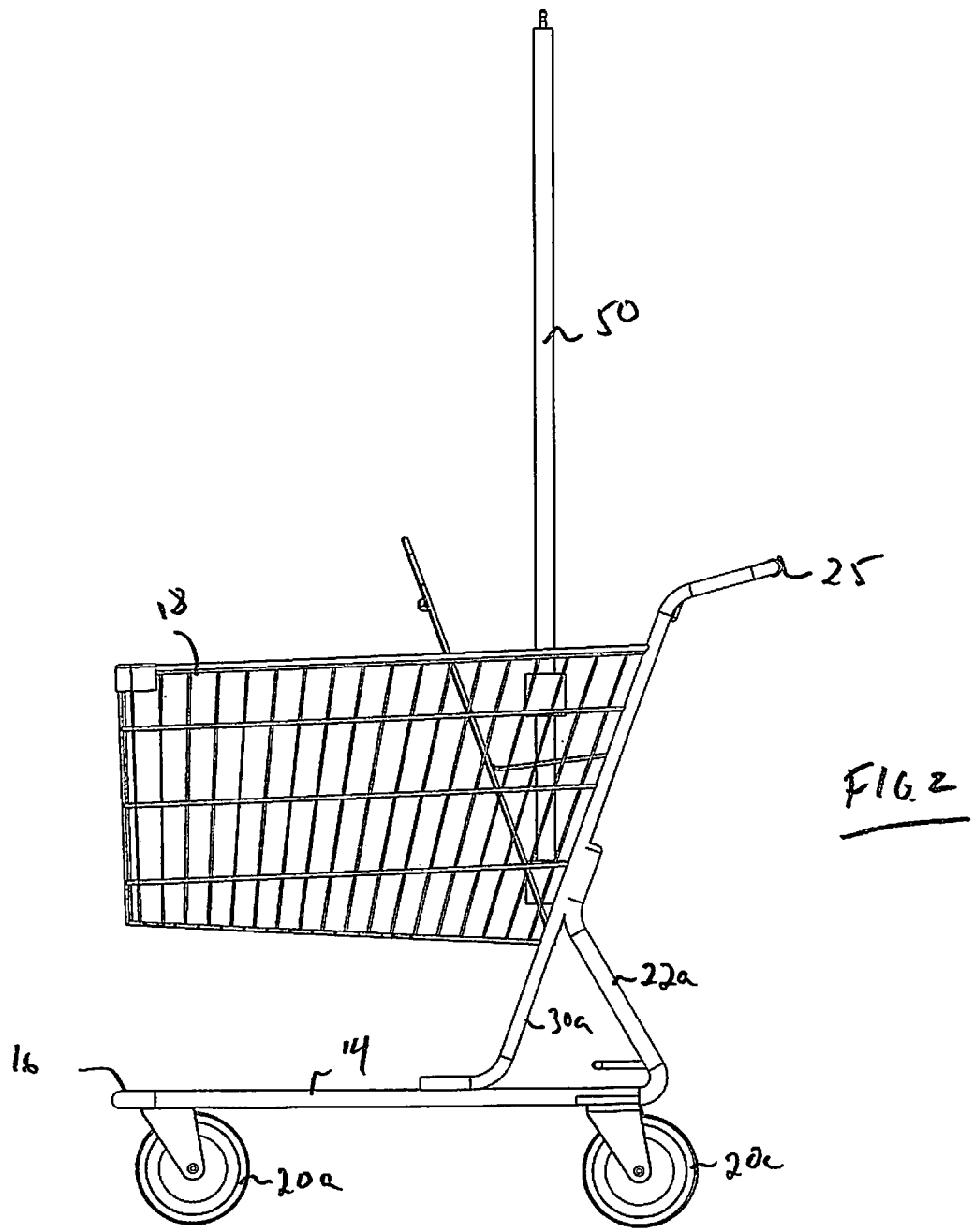
FIG. 2 is a left elevational view of the shopping cart of FIG. 1.
Figure 3:
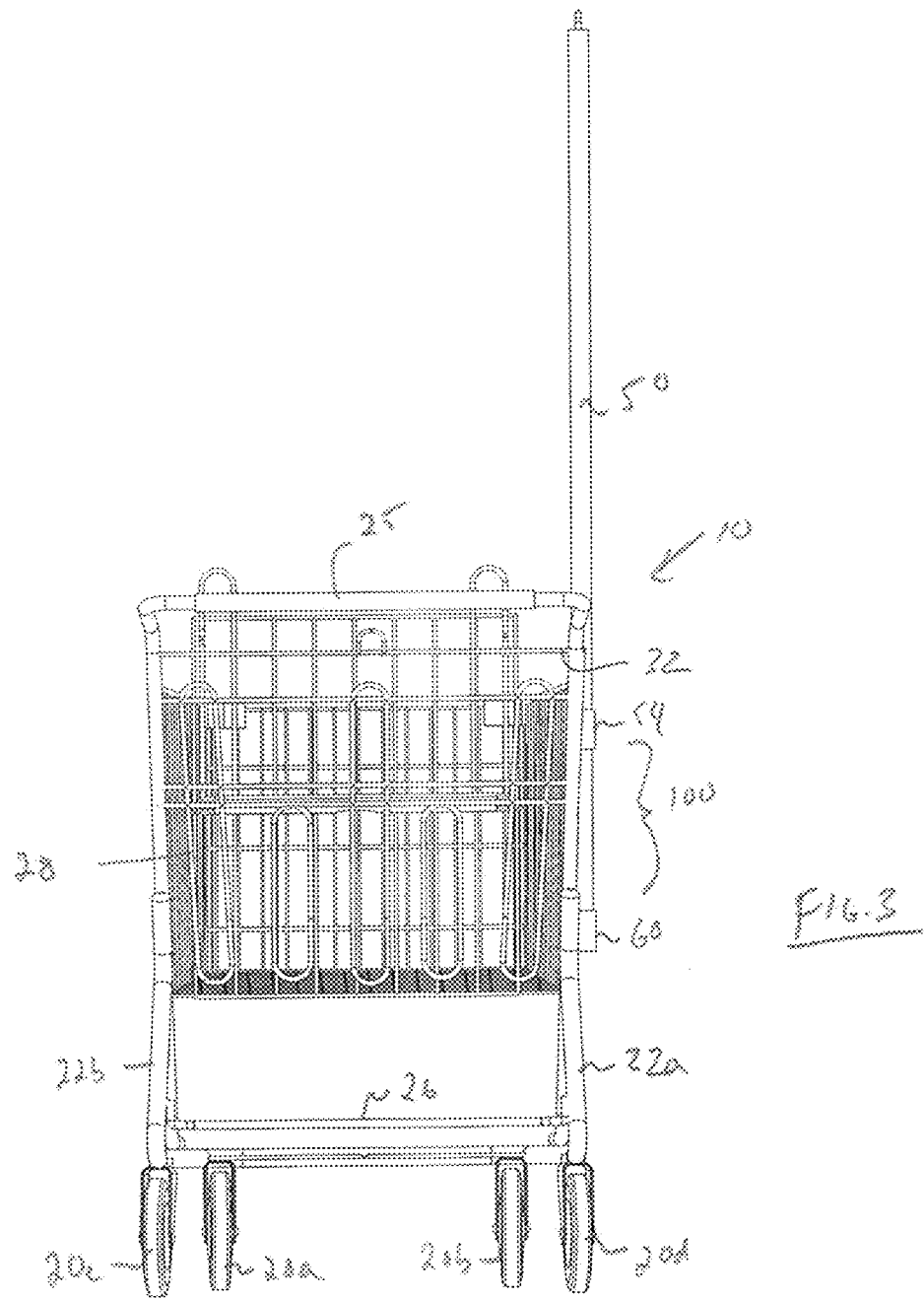
FIG. 3 is a rear view of the shopping cart of FIG. 1.
Figure 4:
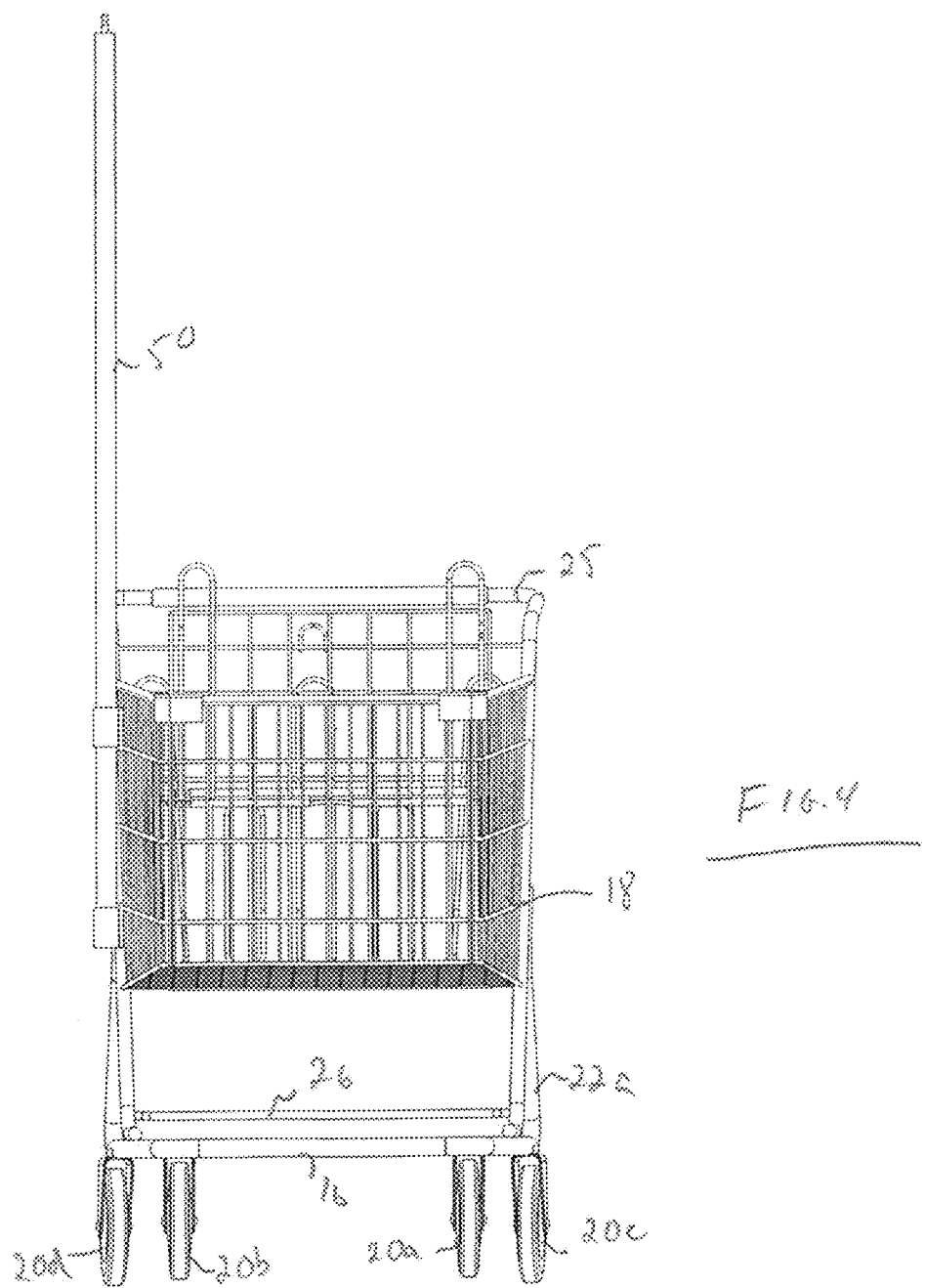
FIG. 4 is a front view of the shopping cart of FIG. 1.

FIGS. 1-6 depict a shopping cart 10, exemplary of an embodiment. Shopping cart 10 includes a basket 12, mounted for rolling on casters 20a, 20b, 20c and 20d (individually and collectively casters 20) by way of frame 14.

Frame 14 includes a base 16, and an upwardly extending basket support 18. Frame 14 may be formed of tubular metal, with base 16 being generally U-shaped, having a cross bar 26 near its rear end. The front edge/end of base 16 is typically narrower than its rear edge/end near cross bar 26. Cross bar 26 is mounted slightly above the remainder of frame 16.

Basket support 18 includes upward extending side supports 30a and 30b extending generally upwardly from base 16 at a slight angle. Vertical brace bars 22a and 22b further extend upwardly from base 16 to brace side supports 20a and 20b respectively. Brace bars 22a and 22b may be formed of the same tube as base 16, but bent to extend upward at an angle from base 16.

A handle 25 extends laterally between supports 30a and 30b. Handle 25 and side supports 30a and 30b may be formed of a further metal tube, bent to be generally U-shaped. Handle 25 may further be coated or encased in a plastic or rubber grip, to allow cart 10 to be pushed or pulled on casters 12.

Basket 12 extends forwardly from basket support 18, and is thus generally cantilevered on basket support 18, providing vertical spacing between the bottom of basket 12 and base 16.

Basket 12 is formed of wire mesh, but could be formed of plastic or other suitable material. Basket 12 has two opposing side walls, and a front wall extending upwardly from a mesh bottom. A rear wall 28 of basket 12 is pivotally mounted on a cross bar 32, to allow rear wall 28 to swing inwardly into basket 12.

As is conventional, cart 10 may be stored in a nested relationship with other carts, which may be identical to or compatible with cart 10. When nested, frame 16 of one cart is rolled within the U-shaped interior of the other cart. Recall, frame 16 tapers to a narrower front, facilitating such nesting. As well, a basket of an identical shopping cart may be rolled through rear wall 28 to allow for nested storage of basket 12 within identical or compatible baskets. Base 16 may roll beneath cross bar 26, in nested arrangement with a cart in advance of cart 12.

Mounted to one of side of cart 10 is a vertically extending pole 50, which may have a circular, rectangular or other cross-section. Pole 50 acts as an anti-theft pole, and extends upward, generally vertically, above the top of cart 10 to a height that is higher than a door frame, arch or anti-theft frame installed within a retail environment. Typically, pole 50 is between 5 and 8 or 9 or more feet (1.5 m-2.5 m or 3 m) in length, is generally straight, and has a generally uniform cross-section. Pole 50 may, for example, have a circular, oval, square or rectangular cross-section. Pole 50 prevents cart 10 from being rolled through the frame, by coming into abutment with the top of a door frame, arch or anti-theft door frame, as the cart is rolled therethrough. Since pole 50 is mounted to cart 10 and pole 50 is generally rigid, the top of the door frame, arch or anti-theft frame exerts an opposing force against pole 50 and thus cart 10 as cart 10 is pushed therethrough. This, in turn, prevents removal of cart 10 from the retail environment. Optionally, rear casters 20*c* and 20*d* of cart 10 may be equipped with an anti-tilt bar, as for example disclosed in U.S. patent application Ser. No. 16/995,596, the contents of which are hereby incorporated by reference.

Pole 50 is attached to cart 10 by mount assembly 52. Mount assembly 52 includes guide sleeve 54 and receptacle 60. Mount assembly 52 is mounted to basket 12 and basket support 18, proximate the rear of cart 10. In this way, cart 10 may still be stored in a nested fashion, as described above, without pole 50 or mount assembly 52 interfering with the nesting of baskets 12. When nested, pole 50 and mount assembly 52 of each cart 10 are not received in an adjacent nested cart.

Pole 50 could, of course, be mounted only to basket 12 or only to basket support 18. Depending on the depth of receptacle 60 and pole 50, guide sleeve 54 could be eliminated. For example, the depth of receptacle 60 could be greater than or equal to twice the depth of guide sleeve 54. Receptacle 60 could be mounted only to basket 12 or only to basket support 18. Alternatively, receptacle 60 could be mounted to both basket 12 and basket support 18. Guide sleeve 54 could thus be eliminated from mount assembly 52.

Pole 50 and receptacle 60 include a one-way interlock assembly 100 that allows pole 50 to be inserted and locked into receptacle 60, and thereafter not be readily removed (e.g. without damaging one-way interlock assembly 100). Moreover, pole 50 may be installed into one-way interlock assembly 100 without any tools, skilled labour, or fasteners.

In an embodiment depicted in FIGS. 5A-5E, one-way interlock assembly 100 includes an insertion fitting 72 proximate a bottom end of pole 50, and a complementary socket 74 within receptacle 60. Together, insertion fitting 72 and socket 74 form a one-way interlock, that allows insertion of fitting 72 into socket 74, but not its removal.

In the depicted embodiment of FIGS. 5A-5E, insertion fitting 72 includes a resiliently biased protrusion 80, protruding through wall of pole 50 and away from pole 50. Protrusion 80 is resiliently biased, outwardly, by a resilient member 82, which may be attached to or in contact with protrusion 80. The outward spring force of resilient member 82 biases protrusion 80 sufficiently for protrusion 80 to protrude through wall of pole 50, while also allowing protrusion 80 to be pressed into pole 50 by hand to be generally flush with an outer surface of pole 50. Protrusion 80 may take the form of a cylindrical or cuboid pin, and may have a round, rectangular or other cross-section.

The end of pole 50 may thus be inserted into receptacle 60 with protrusion 80 in an inwardly pressed state, wherein protrusion 80 may be generally flush with the outer surface of pole 80. Socket 74 further includes an indent 90, in the form of a hole, groove or other indent that receives protrusion 80 in its extended state. For example, indent 90 may be a circular, square or rectangular hole.

By pressing protrusion 80 into pole 50 to be generally flush with the outer surface of pole 50, the end of pole 50 may be inserted into receptacle 60 and protrusion 80 may be slid along the inner wall of receptacle 60 in its inwardly pressed state. Inner wall of receptacle 60 urges against the outward spring force of resilient member 82, maintaining protrusion 80 in its inwardly pressed state. Once protrusion 80 is aligned with indent 90, inner wall of receptacle 60 no longer urges protrusion 80 inwardly, thus allowing protrusion 80 to extend from its inwardly pressed state into its extended state, into indent 90. In the event that pole 50 is round (as illustrated), it may be rotated within socket 74 about the central axis of pole 50 to align protrusion 80 with indent 90. Protrusion 80 may remain in its inwardly pressed state until pole 50 has been rotated sufficiently within socket 74 for protrusion 80 to align with indent 90.

Once pole 50 has been inserted into receptacle 60 and protrusion 80 has extended into indent 90, protrusion 80 will be biased into indent 90 and pole 50 will be locked into receptacle 60. In this state, insertion fitting 72 may contact the bottom of socket 74, such that the bottom end of pole 50 rests against the inside of receptacle 60. Alternatively, insertion fitting 72 may be suspended above the bottom of socket 74 by protrusion 80 extended into indent 90, which may prevent pole 50 from being inserted fully inserted into receptacle 60.

As will be appreciated, cart 10 may be moved to a shopping facility—typically a store—with pole 50 unattached. Cart 10 may thus be rolled beneath any obstruction (e.g. a frame or doorway) to the top of pole 50, prior to installation of pole 50. Pole 50 may then be inserted into receptacle 60, with bottom end of pole 50 received by receptacle 60. Protrusion 80, in turn will be biased into socket 74, by biasing member 82. Thus, pole 50 may be installed without any tools, skilled labour, or fasteners. Once protrusion 80 is within indent 90, protrusion 80 cannot be pressed into pole 50, as it was when pole 50 was inserted into receptacle 60, because there is no point of access into indent 90. Further, receptacle 60 constrains movement of pole 50, to prevent any material lateral (i.e. left/right) or vertical (i.e. up/down) movement. As such, protrusion 80, once extended into indent 90, is effectively locked into place, preventing removal of protrusion 80 from indent 90 and thus pole 50 from receptacle 60. If pole 50 is pulled upward, the top edge of protrusion 80 contacts the upper edge of indent 90, preventing pole 50 from moving upward. Similarly, if pole 50 is pushed downward, the bottom edge of protrusion 80 contacts the bottom edge of indent 90, preventing pole 50 from moving downward.

In other embodiments, protrusion 80 on pole 50 may be otherwise compressible. For example, protrusion 80 may a compressible pin, which may be cylindrical or cuboid, and may have a round, rectangular or other cross-section. In its inwardly pressed state, protrusion 80 may compress such that it is flush with outer surface of pole 50. Protrusion 80 may otherwise behave as described above. Once protrusion 80 is aligned with indent 90, inner wall of receptacle 60 no longer urges protrusion 80 inwardly, thus allowing protrusion 80 to extend from its inwardly pressed state into its extended state, into indent 90. Thus, pole 50 may be locked into receptacle 60.

In further embodiments, protrusion 80 may be a compressible pin but resilient member 82 may be eliminated. Protrusion 80, when compressed, may produce an outward spring force. For example, protrusion 80 may be a small spring. By pressing protrusion 80 into pole 50 to be generally flush with the outer surface of pole 50, the end of pole 50 may be inserted into receptacle 60 and protrusion 80 may be slid along the inner wall of receptacle 60 in its inwardly pressed state. Inner wall of receptacle 60 may urge against the outward spring force of protrusion 80, maintaining protrusion 80 in its inwardly pressed state. Once protrusion 80 is aligned with indent 90, inner wall of receptacle 60 may no longer urge protrusion 80 inwardly, thus allowing protrusion 80 to extend from its inwardly pressed state into its extended state, into indent 90. Thus, pole 50 may be locked into receptacle 60.

Alternatively, protrusion 80 may be a non-compressible pin surrounded by a compressible annulus. The non-compressible pin may be cylindrical or cuboid, and may have a round, rectangular or other cross-section. However, the diameter of the cross-section of the non-compressible pin may be less than the diameter of indent 90, while the diameter of the cross-section of the compressible annulus may be greater than the diameter of indent 90. By pressing protrusion 80 into pole 50 to be generally flush with the outer surface of pole 50, the end of pole 50 may be inserted into receptacle 60 and protrusion 80 may be slid along the inner wall of receptacle 60 in its inwardly pressed state. Inner wall of receptacle 60 may urge against the outward spring force of resilient member 82, maintaining protrusion 80 in its inwardly pressed state. Once protrusion 80 is aligned with indent 90, inner wall of receptacle 60 may no longer urge protrusion 80 inwardly, thus allowing protrusion 80 to extend from its inwardly pressed state into its extended state. The non-compressible pin of protrusion 80 may extend into indent 90, but the compressible anulus of protrusion 80 may initially contact the edges of indent 90 and prevent protrusion 80 from fully extending into indent 90. However, the spring force of resilient member 82 may act against protrusion 80, causing the compressible anulus to deform against the edges of indent 90 and allowing protrusion 80 to slide fully into indent 80. Thus, pole 50 may be locked into receptacle 60.

In a further alternate embodiment, protrusion 80 may be formed of one or more metal tongues that extend radially outward from pole 50. The metal tongues may be resiliently biased such that they extend radially outward from pole 50 at an elevated angle from the surface of pole 50. As pole 50 is inserted into receptacle 60 and the metal tongues pass into socket 74, the metal tongues may be compressed inwardly towards the outer surface of pole 50 (but outwardly from the radial centre of the metal tongues) by the inner wall of receptacle 60. Although the radius of indent 90 may be greater than the radius of the metal tongues, when the metal tongues are aligned with indent 90, the outward spring force of the metal tongues may cause the metal tongues to extend outwardly from the outer surface of pole 50 (but inwardly towards the radial centre of the metal tongues), such that the metal tongues elastically deform and extend into indent 90. Since the radius of the extended metal tongues may be greater than the radius of indent 90, the metal tongues may remain extended into indent 90 despite any upward or downward force against pole 50. Thus, when the metal tongues are biased into indent 90, pole 50 will be locked into receptacle 60.

In a further alternate embodiment, indent 90 may be compressible. For example, indent 90 may be in the form of a hole, groove or other indent that receives protrusion 80 in its extended state (e.g. a circular, square or rectangular hole). Indent 90 may additionally include a compressible annulus whose diameter is smaller than the hole or groove of indent 90. Once protrusion 80 is aligned with indent 90, protrusion 80 may extend from its inwardly pressed state into its extended state. Protrusion 80 may initially contact the compressible annulus of indent 90, which may prevent protrusion 80 from fully extending into indent 90. However, the spring force of resilient member 82 may act against protrusion 80, causing the compressible anulus of indent 90 to deform against protrusion 80, such that protrusion 80 may slide fully into indent 80. Thus, pole 50 may be locked into receptacle 60.

Alternatively, indent 90 may be formed on pole 50 (instead of in socket 74) and protrusion 80 may be formed in socket 74 (instead of on pole 50). In such embodiments, one or more of the forms of protrusion 80 and indent 90 may be used or combined to form a one-way interlock assembly to lock pole 50 into socket 74. As well, other forms of protrusion 80 and indent 90 may be used to form a one-way interlock assembly. For example, protrusion 80 may initially be locked in a detracted state by an external latch. Once pole 50 has been inserted into receptacle 60, the external latch may be released and protrusion 80 may extend into indent 90. The external latch may not be used to retract protrusion 80.

In an alternate embodiment depicted in FIGS. 6A-6E, an alternate one-way interlock assembly may be formed with an indent 90' formed on pole 50' and a protrusion 80', in the form of an annular rib, that extends from the interior of a socket 74'. Pole 50' may otherwise be like pole 50 of FIGS. 5A-5D. Indent 90' may be formed as an annular groove around the periphery of a tip 92 of pole 50'. Tip 92 may be terminated in a cylindrical nib, extending from a tapered shaft. The end of tip 92 may also be chamfered. Either protrusion 80' or tip 92 may be formed to be resilient or compressible, or to have a surface that allows tip 92 to slide into socket 74', such that indent 90' may slide beyond protrusion 80' into socket 74'. For example, protrusion 80' may be slightly resilient and tip 92 may be slightly deformable, such that tip 92 may deform to allow indent 90' to slide beyond protrusion 80' into socket 74'. Alternatively, protrusion 80' may be slightly deformable and tip 92 may be slightly resilient, such that protrusion 80' may deform to allow indent 90' to slide beyond protrusion 80' into socket 74'. The chamfered edge of tip 92 may further allow tip 92 to slightly deform protrusion 80', which may be annulus, allowing indent 90' to slide beyond protrusion 80' and thus tip 92 to slide into socket 74'.

Once within socket 74', upward motion of tip 92 causes an upper edge of indent 90' to collide with a bottom edge of protrusion 80', thereby preventing the removal of tip 92 from socket 74'. The bottom edge of protrusion 80' may not be deformable when tip 92 is pulled upward relative to protrusion 80'. For example, the bottom edge of protrusion 80' may only deform when pushed downward, such as when tip 92 slides into socket 74'. However, the bottom edge of protrusion 80' may not deform when pushed upward, thus preventing the removal of tip 92 from socket 74'. In this state, pole 50' will be locked into receptacle 60.

In a further alternate embodiment of the one-way interlock assembly depicted in FIGS. 6A-6E, socket 74' and protrusion 80' may be formed on pole 50' (instead of in receptacle 60') and tip 92 and indent 90' may be formed in receptacle 60' (instead of on pole 50').

Other interlock geometries will be appreciated by those of ordinary skill.

Of course, the above described embodiments are intended to be illustrative only and in no way limiting. The described embodiments are susceptible to many modifications of form, arrangement of parts, details and order of operation. The invention is intended to encompass all such modification within its scope, as defined by the claims.

What is claimed is:

1. A shopping cart, comprising a rolling frame and a basket supported by said frame, and a receptacle for receiving an anti-theft pole in a generally vertical orientation, said receptacle comprising a one-way interlock for locking said pole in said receptacle without aid of a tool, wherein said interlock is inaccessible after said pole is locked in said receptacle, so that said pole may not be removed from said interlock without rendering said interlock unusable.

2. The shopping cart of claim 1, wherein said interlock comprises a protrusion on said pole, and an indent to receive said protrusion.

3. The shopping cart of claim 2, wherein said protrusion is resiliently biased so as to be urged into said receptacle, when said pole is received in said socket.

4. The shopping cart of claim 2, wherein said pole has a generally round cross-section and wherein said protrusion extends radially from said pole.

5. The shopping cart of claim 2, further comprising a resilient member urging said protrusion from said pole.

6. The shopping cart of claim 2, wherein said protrusion is compressible.

7. A shopping cart, comprising a rolling frame and a basket supported by said frame, and a receptacle for receiving an anti-theft pole in a generally vertical orientation, said receptacle comprising a one-way interlock for locking said pole in said receptacle, so that said pole may not be removed from said interlock without damaging said interlock, wherein said one-way interlock comprises an annular lip in said receptacle, that resists withdrawal of a tip of said pole from said receptacle.

8. The shopping cart of claim 1, wherein said interlock comprises a protrusion in said receptacle and an indent on said pole, to receive said protrusion.

9. A method of deploying an anti-theft shopping cart, comprising a rolling frame and a basket supported by said frame, and a receptacle for receiving an anti-theft pole in a generally vertical orientation, said receptacle comprising a one-way interlock for locking said anti-theft pole in said receptacle without aid of a tool, so that said pole may not be removed from said interlock without damaging said interlock, said method comprising delivering said cart with said pole detached from said cart to an establishment where said anti-theft shopping cart is to be used, and inserting said anti-theft pole into said receptacle to lock said anti-theft pole into place, wherein said interlock is inaccessible after said anti-theft pole is locked in said receptacle and wherein said pole may not be removed from said interlock without damaging said interlock.

10. The method of claim 9, wherein deploying said anti-theft shopping cart does not require any additional tools, skilled labour, or fasteners.

11. A shopping cart, comprising a rolling frame and a basket supported by said frame, and a receptacle for receiving an anti-theft pole in a generally vertical orientation, said receptacle comprising a one-way interlock for locking said pole in said receptacle without aid of a tool, so that said pole may not be removed from said interlock without damaging said interlock wherein said interlock comprises a biased protrusion on said pole, and an indent to receive said protrusion with said pole in said receptacle, wherein said indent and said biased protrusion are inaccessible after said protrusion is received in said indent.

12. The shopping cart of claim 11, wherein said receptacle has a generally circular cross-section, and wherein said indent is formed in an inner wall of receptacle.

13. The shopping cart of claim 11, wherein said receptacle has a generally circular cross-section, and wherein said indent is formed in an inner wall of receptacle.

14. The shopping cart of claim 11, wherein said protrusion is compressible.

\* \* \* \* \*